United States Patent [19]
Heininger

[11] 3,912,407
[45] Oct. 14, 1975

[54] CORNER CONNECTOR
[75] Inventor: Richard T. Heininger, Gardner, Mass.
[73] Assignee: GEM Industries, Inc., Gardner, Mass.
[22] Filed: July 30, 1974
[21] Appl. No.: 493,177

[52] U.S. Cl. .................. 403/406; 403/231; 52/657; 52/475
[51] Int. Cl.² ........................ B25G 3/00; F16B 7/00
[58] Field of Search ........... 403/191, 231, 266, 267, 403/270, 271, 272, 401, 406; 52/758 H, 656, 657, 475

[56] References Cited
UNITED STATES PATENTS
230,438   7/1880   Porter ................................ 403/231
2,473,217   6/1949   Peoples .......................... 403/231 X Primary Examiner—Thomas F. Callaghan
Assistant Examiner—Wayne L. Shedd
Attorney, Agent, or Firm—Charles R. Fay

[57] ABSTRACT

A corner construction for open metal frames of angle iron comprising a pair of triangular plates welded flatwise together along one edge and having spaced edges along the other two edges, with upstanding spaced flanges at the spaced edges forming right angle channels frictionally receiving the ends of a pair of angle irons at angles to each other.

8 Claims, 9 Drawing Figures

CORNER CONNECTOR

BACKGROUND OF THE INVENTION

Corner constructions for angle iron frames e.g., for mattress supports, are made by riveting and this is a bottleneck in that the frames are heavy and have to be handled and turned four times to rivet the four corners.

SUMMARY OF THE INVENTION

Corner brackets are made of two triangular plates welded flatwise together adjacent one edge and being spaced along the other two edges which are at right angles to each other. The spaced edge portions have parallel and spaced flanges to form a continuous rounded corner and are parallel with and intersect the spaced edge portions of the plate. This forms a pair of spaced, angled channels at right angles to each other, frictionally and slidably receiving the ends of a pair of angle irons.

PREFERRED EMBODIMENT OF THE INVENTION

Figure 1:
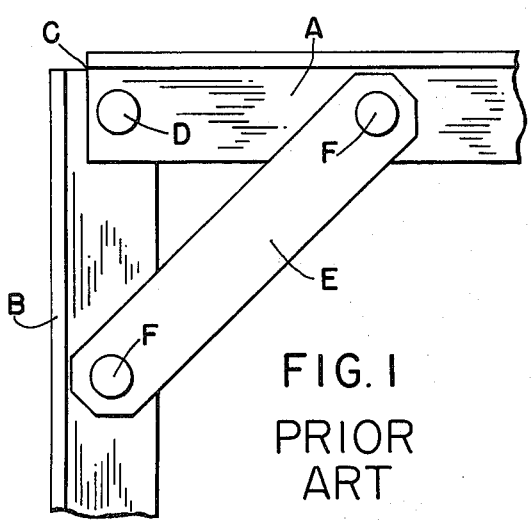
FIG. 1 shows the prior art.
Figure 2:
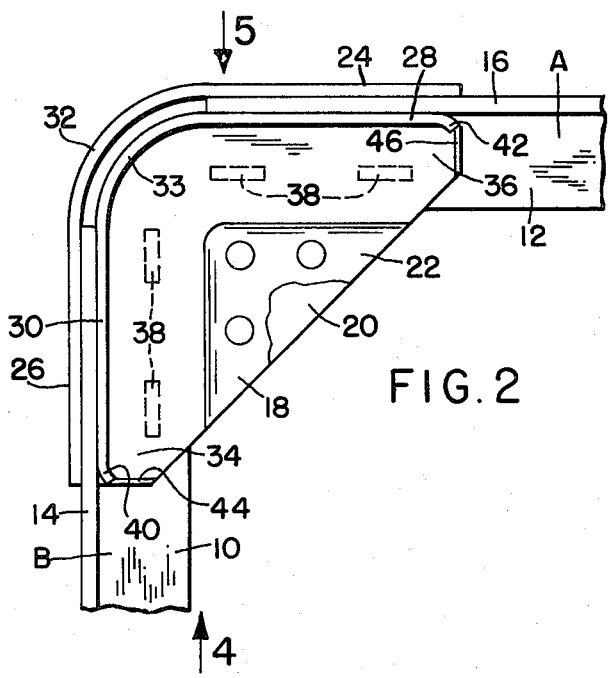
FIG. 2 is a top plan view of the new corner.
Figure 3:
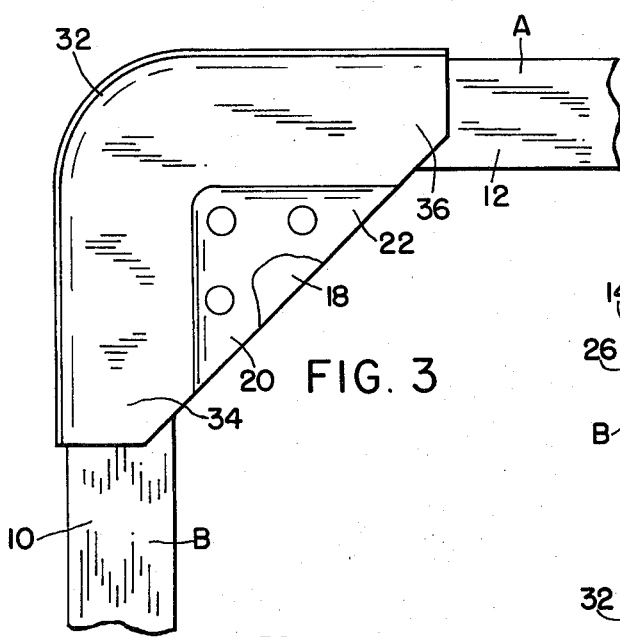
FIG. 3 is a bottom plan view thereof.

FIG. 1 illustrates the prior art in the form of a commercial and simply made corner for an open frame for instance for a mattress spring. The two angle-irons A and B are overlaid in the area at C and rivet D is applied thereto. A brace E is riveted to both A and B at F, F. This being done at each corner forms an open rectangular frame for the application for springs, etc., thereto. This type of frame is difficult to make insofar as the labor is concerned because it means handling the frame to provide three rivets at the four successive corners one after the other, and such handling is tiring and slow.

In the present invention the parts are not mechanically connected. Instead they are forced into slots or channels formed by two-part corner brackets and are held therein by friction when the frame is completed and the mattress support fabric is connected with respect to the four angle-irons that go up to make the frame. The frame cannot then be disassembled even though there are no mechanical connections such as detents, welding, or rivets, because of the fact that in order to slide any angle iron out of any corner the spring supporting fabric has to be removed first since it resists, and in fact prohibits, the disassembly of any angle iron from any corner bracket.

Now referring to FIGS. 2, 3, 4, and 5, the respective angle irons are again indicated as A and B. These angle irons have the usual horizontal flanges 10, 12 and vertical flanges 14, 16.

The bracket in this case is formed of two plates 18 and 20 which may be welded together in flatwise contact in the areas at 22. These plates are generally triangular and each one has an upturned edge flange, the flange on plate 20 being indicated at 24, 26 and the flange on plate 18 being indicated at 28, 30. Each flange is continuous from end to end, see the arced areas 32 and 34 which form a smooth rounded corner for the frame in contradistinction to the open cut edge corner at point C in FIG. 1.

Figure 4:
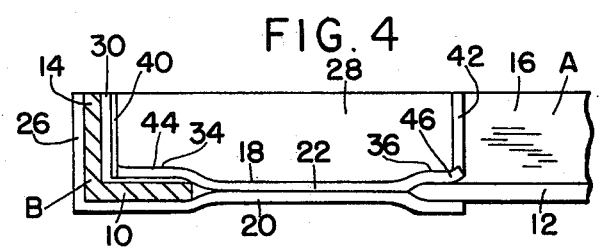
FIG. 4 is a view looking in the direction of arrow 4 in FIG. 2.
Figure 5:
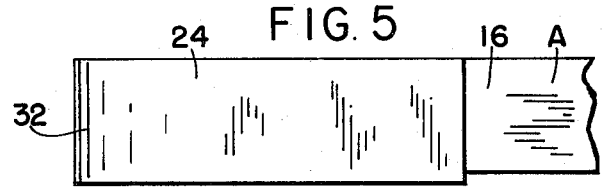
FIG. 5 is a view looking in the direction of arrow 5 in FIG. 2.

Between the respective flanges and the flat portions at 22 these plates are separated slightly as is best seen in FIG. 4 and as is indicated at 34 and 36. The flanges themselves are slightly spaced so as to receive the two angle irons slidably therein, angle iron B being slid into the channel between flanges 26, 30 and angle iron A being slid inbetween the flanges 24 and 28.

The space between the bracket plates at 34 and 36 is such as to require a relatively forceful entry of these angle irons with sufficient friction between the flanges, the plates, and the angle irons to firmly hold the angle irons in position. They can be disassembled by using considerable force but when the mattress supporting fabric is secured with respect to angle irons 10 and 12, and their complementary parts not shown, which form the entire frame, it is impossible to disassemble any of the angle irons or even to cause them to move.

Incidentally, however, if detents springing into holes should be desired they could be placed according to the dotted line showings at 38, 38. Such detents are believed to be well known in the art. That is, there could be holes cut in the flanges of the angle irons and dents on the plates could of course then snap into the holes when reached, but these have been found not to be necessary although usable if wanted.

It will be seen that a very firm and rigid corner has been effected, this corner containing no rivets and in fact avoiding mechanical connections of any kind, and at the same time it provides for a smooth outer rounded corner at 32 as described so that it is easier and faster to assemble; and it is also safer for the occupant of the bed or crib or other user of the frame constructed according to the present invention.

If desired, the terminal end portions of the flanges 30 and 28 may be spread as at 40 and 42 to provide an entrance guide for the leading end of the respective angle irons A and B, and the same may be done to the plates as at 44 and 46.

Figure 6:
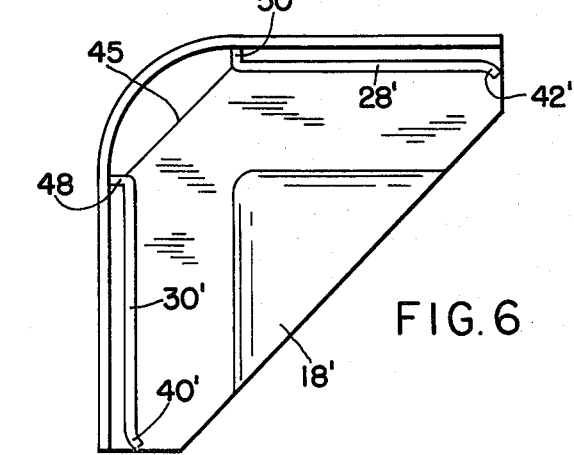
FIGS. 6 and 7 are plan views of modifications.

As shown in FIG. 6 a similar construction can be used but in this case plate 18' is truncated along a line 45 and the flanges 30' and 28', in addition to the guides 40' and 42' are provided with inturned end stops 48 and 50 which stop and locate the inward thrust of the respective angle irons.

Figure 7:
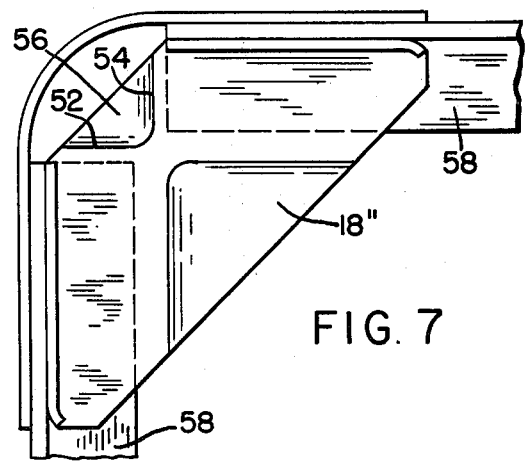

In FIG. 7 the construction is very similar to that of FIG. 6 except that the stops 48 and 50 are omitted and instead the angle-irons are stopped by the two downward edges 52 and 54 of a depression 56 at the apex of plate 18''. That is, the other angle of the angle-iron is stopped, not that at 14, 16, and this angle is indicated at 58 in FIG. 7.

Figure 8:
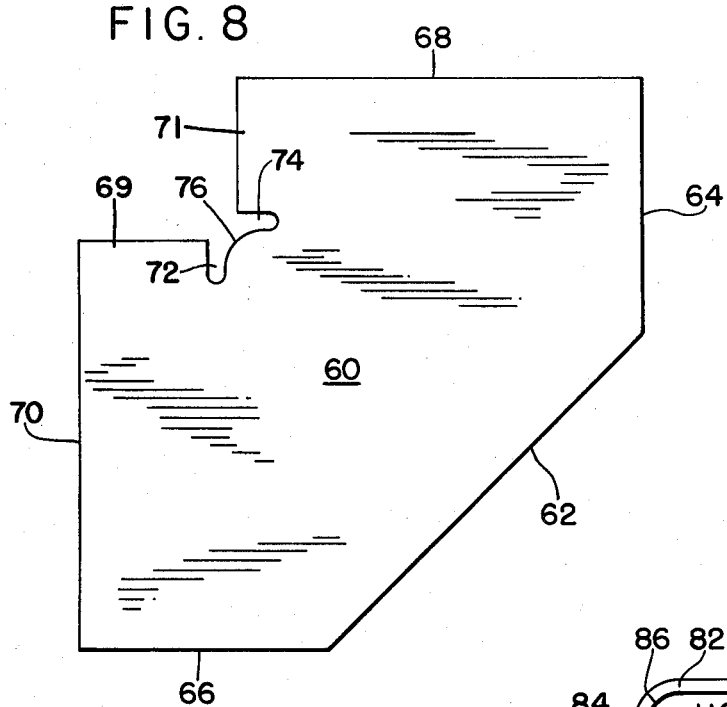
FIG. 8 is a plan view of a blank for a still further modification.
Figure 9:
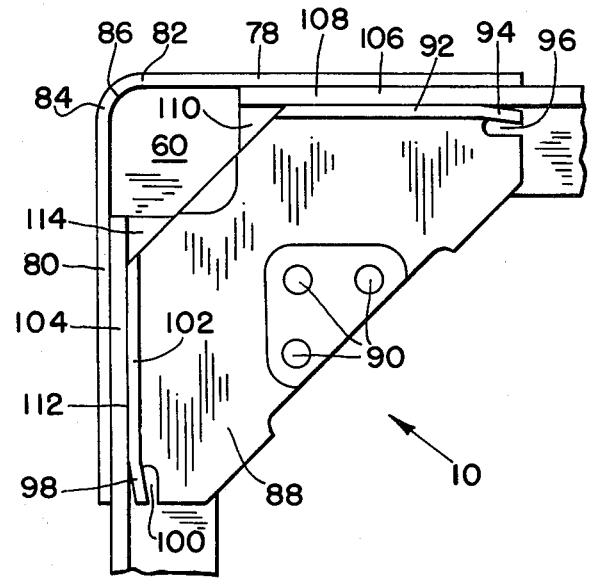
FIG. 9 is a plan view of the modification made from the blank of FIG. 8.

Referring now to FIGS. 8 and 9, a flat blank is cut according to the showing in FIG. 8. This blank is indicated at 60 and it has a diagonal edge 62 and is formed along lines 64, 66, 68, and 70. It is indented oppositely to the inclined line 62 as at 69 and 71 and at the apex of the indentation it is again indented and has right angled openings 72 and 73 joined by the arc-shaped edge 76. The portion having the edge 68 is bent up even with opening 74 to form the flange 78, see FIG. 9, and the corresponding portion having the edge 70 is bent up forming the flange 80. End portions 82 of flange 78 and 84 of flange 80 are turned in toward each other on an arc so that the edges abut, there being merely a line 86 at the center of the arc-shaped portion formed thereby. The edges of the openings 72 and 74 come to rest against portions of the arc-shaped edge at 76 thereby forming a closed corner.

The top part 88 is then welded as at 90 to the bottom part 60 in the manner described previously. The top part 88 has a flange 92 spaced from flange 78 and a bent down entrance portion 94 bent into an opening at 96. The same construction is provided for flange 102, see the entry portion 98 bent into the opening 100 for this portion forming an entrance into the space between flange 80 and flange 102 on the upper part 88.

It will thus be seen that the flange 104 on one angle-iron is accommodated generally frictionally between flanges 80 and 102 and correspondingly the flange 108 on the other angle-iron is likewise accommodated between flanges 92 and 78.

I claim:

1. A corner construction for joining a pair of elongated members adapted to be secured together comprising a pair of plates secured together in flatwise condition, said plates having unsecured edge portions at angles to each other, said unsecured portions being slightly separated sufficiently to slidingly receive the elongated elements to be connected, and spaced parts on the plates forming channels slidably receiving said elements at end portions thereof, the end portions of said elements being adjacent to each other and divergent, said plates including upturned parallel flanges on both plates forming additional channels at general right angles to the first named channels, said elongated elements being angle irons each of which includes two flanges generally at right angles to each other, said flanges being receivable in the respective channels.

2. The corner construction of claim 1 wherein at least one of said plate flanges is continuous from end to end thereof to form a rounded corner located outwardly from the corresponding adjacent end of said angle irons.

3. The corner construction of claim 2 wherein both of the plates comprising the bracket are provided with rounded corners.

4. The corner construction of claim 2 where but one of the flanges is rounded.

5. The corner construction of claim 2 where but one of the flanges is rounded, the other flanges being bent inwardly forming stops for limiting the penetration of the angle irons.

6. The corner construction of claim 2 including an outwardly divergent portion on one of said flanges forming a guide for insertion of the flanges of the angle irons.

7. The corner construction of claim 6 including divergent guide portions on the plates contiguous to the divergent guide portions on the flanges.

8. The corner construction of claim 1 including detents and complementary receptive areas therefor in the plates and elongated members.

* * * * *